(12) United States Patent
Taniguchi et al.

(10) Patent No.: US 10,005,151 B2
(45) Date of Patent: Jun. 26, 2018

(54) FRICTION STIR WELDING METHOD FOR STEEL SHEETS AND METHOD OF MANUFACTURING JOINT

(71) Applicant: JFE Steel Corporation, Tokyo (JP)

(72) Inventors: Koichi Taniguchi, Tokyo (JP); Muneo Matsushita, Tokyo (JP); Rinsei Ikeda, Tokyo (JP)

(73) Assignee: JFE Steel Corporation (JP)

( * ) Notice: Subject to any disclaimer, the term of this patent is extended or adjusted under 35 U.S.C. 154(b) by 0 days. days.

(21) Appl. No.: 15/025,667

(22) PCT Filed: Sep. 29, 2014

(86) PCT No.: PCT/JP2014/004985
§ 371 (c)(1),
(2) Date: Mar. 29, 2016

(87) PCT Pub. No.: WO2015/045421
PCT Pub. Date: Apr. 2, 2015

(65) Prior Publication Data
US 2016/0214203 A1    Jul. 28, 2016

(30) Foreign Application Priority Data

Sep. 30, 2013 (JP) .................................. 2013-205251
Oct. 31, 2013 (JP) .................................. 2013-227447

(51) Int. Cl.
*B23K 20/12*      (2006.01)
*B23K 20/227*    (2006.01)
(Continued)

(52) U.S. Cl.
CPC ........ *B23K 20/122* (2013.01); *B23K 20/1235* (2013.01); *B23K 20/22* (2013.01);
(Continued)

(58) Field of Classification Search
CPC ...................................... B23K 20/122–20/128
(Continued)

(56) References Cited

U.S. PATENT DOCUMENTS 4,228,337 A * 10/1980 Caldwell ............... B23K 25/00
                                                                      219/137 WM
4,394,187 A *  7/1983 Ohtani .................... C22C 38/32
                                                                      148/334
(Continued)

FOREIGN PATENT DOCUMENTS

CA      2869382 A1 * 10/2013   .......... B23K 20/227
CN    103898310 B  *  8/2016
(Continued)

OTHER PUBLICATIONS

Supplementary European Search Report dated Oct. 20, 2016, of corresponding European Application No. 14847249.1.
(Continued)

*Primary Examiner* — Kiley Stoner
(74) *Attorney, Agent, or Firm* — DLA Piper LLP (US)

(57) ABSTRACT

A friction stir welding method for steel sheets includes inserting a rotating tool into an unwelded portion where two or more steel sheets are overlapped or butted together; moving the rotating tool along portions to be welded while rotating the tool so that a softened portion is formed in the steel sheets by friction heat generated between the rotating tool and the steel sheets, and the steel sheets are welded together by utilizing a plastic flow generated by the softened portion being stirred; and preheating the unwelded portion before welding by the rotating tool by a pair of heating devices disposed over and under the unwelded portion and ahead of the rotating tool in the advancing direction to enable high speed welding without the risk of generation of welding defects and damage to the welding tool.

20 Claims, 3 Drawing Sheets

(51) Int. Cl.
*C21D 9/50* (2006.01)
*C21D 1/42* (2006.01)
*B23K 20/22* (2006.01)
*B23K 20/24* (2006.01)
*B23K 20/26* (2006.01)
*B23K 31/02* (2006.01)
*B23K 101/18* (2006.01)
*B23K 103/04* (2006.01)

(52) U.S. Cl.
CPC ............ *B23K 20/227* (2013.01); *B23K 20/24* (2013.01); *B23K 20/26* (2013.01); *B23K 31/02* (2013.01); *C21D 1/42* (2013.01); *C21D 9/50* (2013.01); *B23K 2201/18* (2013.01); *B23K 2203/04* (2013.01); *B23K 2203/05* (2015.10); *Y02P 10/253* (2015.11)

(58) Field of Classification Search
USPC .............................................. 228/2.1, 112.1
See application file for complete search history.

(56) References Cited

U.S. PATENT DOCUMENTS

| | | | | | |
|---|---|---|---|---|---|
| 4,814,236 | A | * | 3/1989 | Qureshi | B23K 35/004 228/119 |
| 5,829,664 | A | * | 11/1998 | Spinella | B23K 20/1235 219/78.13 |
| 5,942,314 | A | * | 8/1999 | Fisher | B23K 20/10 228/1.1 |
| 6,290,904 | B1 | | 9/2001 | Kawano | B23K 35/308 420/106 |
| 6,499,946 | B1 | * | 12/2002 | Yamada | C22C 38/22 415/199.4 |
| 6,802,444 | B1 | * | 10/2004 | Petter | B23K 20/123 148/516 |
| 7,980,449 | B2 | | 7/2011 | Ding | B23K 20/001 228/112.1 |
| 2003/0116608 | A1 | * | 6/2003 | Litwinski | B23K 20/1235 228/112.1 |
| 2004/0020970 | A1 | * | 2/2004 | Palm | B23K 20/1235 228/112.1 |
| 2004/0046003 | A1 | * | 3/2004 | Vyas | B23K 20/1235 228/112.1 |
| 2004/0056075 | A1 | * | 3/2004 | Gheorghe | B23K 20/122 228/199 |
| 2005/0224562 | A1 | * | 10/2005 | Prevey | B23K 9/00 228/233.1 |
| 2005/0257853 | A1 | * | 11/2005 | Yamashita | B23K 35/0255 148/26 |
| 2006/0065698 | A1 | * | 3/2006 | Ishikawa | B23K 20/1265 228/112.1 |
| 2006/0086707 | A1 | * | 4/2006 | Kou | B23K 9/167 219/137 R |
| 2006/0231595 | A1 | | 10/2006 | Quinn et al. | |
| 2007/0090159 | A1 | * | 4/2007 | Nagano | B23K 37/0435 228/101 |
| 2007/0138239 | A1 | * | 6/2007 | Kumagai | B23K 20/1235 228/227 |
| 2008/0099533 | A1 | * | 5/2008 | Hanlon | B23K 20/122 228/112.1 |
| 2008/0105340 | A1 | * | 5/2008 | Huff | C21D 6/004 148/607 |
| 2008/0105341 | A1 | * | 5/2008 | Huff | B32B 15/011 148/622 |
| 2008/0302539 | A1 | * | 12/2008 | Mallenahalli | B23K 20/1225 166/380 |
| 2009/0020191 | A1 | * | 1/2009 | Messer | C21D 9/50 148/529 |
| 2009/0134203 | A1 | * | 5/2009 | Domec | B23K 20/123 228/112.1 |
| 2009/0261146 | A1 | * | 10/2009 | Hou | B23K 20/122 228/112.1 |
| 2010/0032413 | A1 | * | 2/2010 | Brenner | B23K 9/23 219/75 |
| 2010/0136369 | A1 | * | 6/2010 | Ayer | B23K 20/1225 428/683 |
| 2010/0258216 | A1 | * | 10/2010 | Wu | C21D 1/42 148/533 |
| 2012/0279271 | A1 | * | 11/2012 | Carter | H05B 6/101 72/342.8 |
| 2012/0298304 | A1 | * | 11/2012 | Kato | B23K 20/1235 156/350 |
| 2012/0328837 | A1 | * | 12/2012 | Goehlich | B23K 20/1255 428/156 |
| 2013/0075452 | A1 | * | 3/2013 | Burford | B23K 20/1255 228/2.1 |
| 2014/0027496 | A1 | * | 1/2014 | Castillo | B23K 20/12 228/102 |
| 2014/0061185 | A1 | * | 3/2014 | Schindele | B23K 20/128 219/617 |
| 2014/0166766 | A1 | * | 6/2014 | Aglan | E01B 31/18 238/122 |
| 2014/0248470 | A1 | * | 9/2014 | Blomqvist | B29C 65/4815 428/188 |
| 2015/0041521 | A1 | * | 2/2015 | Matsushita | B23K 20/227 228/112.1 |
| 2016/0105935 | A1 | * | 4/2016 | Jones | H05B 11/00 219/601 |

FOREIGN PATENT DOCUMENTS

| | | | | |
|---|---|---|---|---|
| JP | 61-49750 | A | | 3/1986 |
| JP | 6-63773 | A | | 3/1994 |
| JP | 3081808 | B2 | | 8/2000 |
| JP | 2001355038 | A | * | 12/2001 |
| JP | 2003-154470 | | | 5/2003 |
| JP | 2004-148350 | | | 5/2004 |
| JP | 2004154790 | A | * | 6/2004 |
| JP | 2005088080 | A | * | 4/2005 ........... B23K 20/123 |
| JP | 2005288474 | A | * | 10/2005 |
| JP | 2005329415 | A | * | 12/2005 ......... B23K 35/0255 |
| JP | 2006045672 | A | * | 2/2006 |
| JP | 2007-263299 | A | | 10/2007 |
| JP | 4235874 | B2 | | 3/2009 |
| JP | 4313714 | B2 | * | 8/2009 |
| JP | 4537132 | B2 | | 9/2010 |
| JP | 2010-260065 | A | | 11/2010 |
| JP | 2011089159 | A | * | 5/2011 |
| JP | 2012-40584 | A | | 3/2012 |
| JP | 2013144837 | A | * | 7/2013 |
| JP | 5549176 | B2 | * | 7/2014 |
| KR | 100833069 | B1 | * | 5/2008 |
| KR | 100833070 | B1 | * | 5/2008 |
| KR | 100833071 | B1 | * | 5/2008 |
| KR | 101505260 | B1 | * | 3/2015 |
| WO | WO 9845080 | A1 | * | 10/1998 ........... B23K 20/126 |
| WO | 2013/081731 | | | 6/2013 |
| WO | WO 2015045299 | A1 | * | 4/2015 ......... B23K 20/1235 |
| WO | WO 2015045420 | A1 | * | 4/2015 ........... B23K 20/122 |
| WO | WO 2015045421 | A1 | * | 4/2015 ........... B23K 20/122 |
| WO | WO 2016147668 | A1 | * | 9/2016 ............. B23K 20/12 |

OTHER PUBLICATIONS

Official Action dated Jan. 12, 2016 of corresponding Japanese Patent Application No. 2015-502990 along with a Concise Statement of Relevance of Office Action in English.
Korean Office Action dated Apr. 25, 2017, of corresponding Korean Application No. 2016-7009120, along with a Concise Statement of Relevance of Office Action in English.
Chinese Office Action dated Nov. 28, 2017, of corresponding Chinese Application No. 201480053331.X, along with a Search Report in English.

(56) References Cited

OTHER PUBLICATIONS

Gan Yong, et al., "10.1 Regular Patterns of Flow Alloying Elements Influence Austenite Transformation," *Steel Materials Handbook*, vol. 2, Jul. 31, 2009, p. 18 (4 pages).

* cited by examiner

FRICTION STIR WELDING METHOD FOR STEEL SHEETS AND METHOD OF MANUFACTURING JOINT

TECHNICAL FIELD

This disclosure relates to a friction stir welding method for steel sheets and, particularly, seeks to accelerate the welding speed.

BACKGROUND

A friction stir welding method is a method of performing welding without adding filler material, by inserting a rotating tool into an unwelded portion of working materials overlapped or butted together, moving the rotating tool while rotating it, and utilizing softening of the working materials caused by frictional heat generated between the rotating tool and the working materials, and the plastic flow created by stirring the softened portions with the rotating tool.

A portion where steel sheets are only butted together and have not been welded yet is referred to as an "unwelded portion", and a portion where steel sheets have been welded and integrated by a plastic flow is referred to as a "welded portion".

Figure 1:
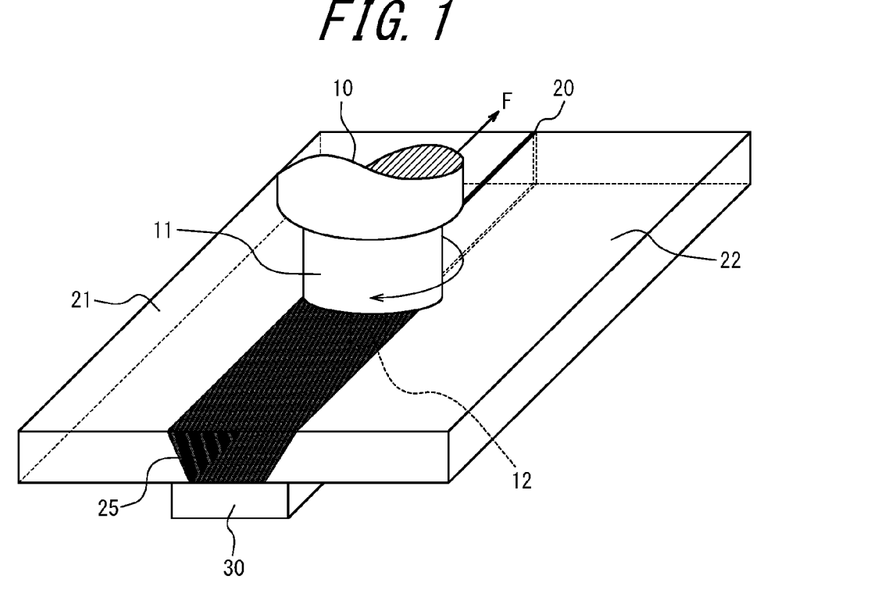
FIG. 1 shows the general welding procedures of when performing friction stir welding on steel sheets which are butted together.

FIG. 1 shows an example of performing friction stir welding on steel sheets butted together.

As described in FIG. 1, with that friction stir welding method, the edge surfaces of steel sheets 21, 22 are butted together to form an unwelded portion 20, and a rotating tool 10 is moved along the unwelded portion 20 while being rotated. The rotating tool 10 is positioned above the steel sheets 21, 22, and configured to be rotated by a motor (not illustrated). A backing material 30 placed under the steel sheets supports the steel sheets when the steel sheets are pressurized by the rotating tool. The rotating tool 10 which is rotated by driving a motor moves in the direction indicated with arrow F while a probe 12 is kept in contact with the steel sheets 21, 22 at the unwelded portion 20. The probe 12 creates partial regions of plastic material around the probe, and the upper part 11 of a rotating body presses the steel sheets 21, 22 from above to prevent the material from being lost from the plastic zone. In this way, the butted portions of the unwelded portion 20 are heated and softened, and the steel sheets 21, 22 are solid state bonded by the plastic material created by the plastic flow to form a welded portion 25.

Regarding such friction stir welding, studies have been made for a method of performing heating separately from the welding using rotating tools for the purpose of accelerating the welding procedures or reducing welding defects.

Figure 2:
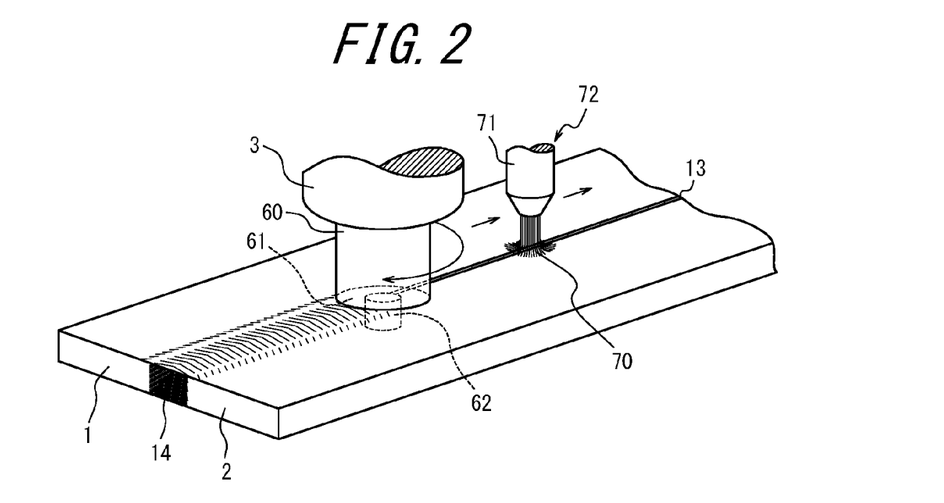
FIG. 2 shows the procedures of when performing friction stir welding using gas flame as the heating device.

For example, JP 3081808 B proposes a welding method using gas flame as the heating device. FIG. 2 shows a schematic diagram describing the procedures of performing friction stir welding using gas flame as the heating device. With that method, various types of gas flame 70 including oxyacetylene, oxypropane, and oxygen natural gas are used as the heat source to heat the welding members 1, 2. With the heating device 72, a substantially cylindrical gas nozzle part 71 from which gas flame 70 is injected is positioned near the front of the probe 62 in the moving direction, and the gas nozzle part 71 moves in conjunction with the movement of the probe 62. Further, the injecting position of the gas flame 70 in the unwelded portion 13 is described as being always positioned ahead of the welding device in the moving direction. Further, the injection width of the gas flame 70 is substantially the same size as the diameter of a shoulder 61 of a rotor 60 when the gas flame strikes the surfaces of the welding members 1, 2 and the tip of the gas flame widens. By doing so, only portions of the unwelded portion 13 near the probe 62 are heated, and the temperature of the portions near the probe and the surrounding regions is raised.

Operation of the heating device when performing the above friction stir welding method will be explained below. While injecting the gas flame 70 from the gas nozzle part 71 of the heating device 72, the rotor 60 of the welding device 3 is rotated and the probe 62 rotating integrally with the rotor 60 is inserted into the unwelded portion 13, and in a state where the probe 62 is inserted, the probe 62 is moved along the butted portion relative to the welding members 1, 2. By doing so, the welding members 1, 2 are welded to form a welded portion 14.

In friction stir welding using the heating device 72 shown in FIG. 2, a goal is to facilitate welding procedures using the probe 62 by heating the unwelded portion with the heat of the gas flame 70 to rapidly soften the contact portion of the probe 62 and the shoulder 61.

In JP 4235874 B, an induction heating device is used as the heat source. According to JP 4235874 B, the time required until initiating friction stir welding is shortened by providing a control mechanism where the temperature up to the temperature where welding is performed by the rotating tool is set to a predetermined temperature and, by doing so, controllability of the heating range and heating temperature is improved and cracks can be prevented from being formed in the welded portion regardless of the material used.

In JP 4537132 B, a laser beam is used as the heat source. According to JP 4537132 B, the unwelded portion is heated before performing welding with a welding tool (which is a rotating tool), and laser beam irradiation is stopped after the unwelded portion reaches a predetermined softening temperature. By doing so, it is described that wear of the welding tool can be suppressed.

As described above, with conventional friction stir welding, techniques of using gas flame, induction heating, or laser beam as the auxiliary heat source during operation have been proposed.

However, when performing friction stir welding of steel sheets using the methods described in JP 3081808 B, JP 4235874 B, and JP 4537132 B, the effect of softening could not be sufficiently obtained and a joint with no defects could not be obtained when welding was performed at a high welding speed, even if it is possible to reduce welding defects or accelerate the welding speed in a certain area.

It could therefore be helpful to provide a friction stir welding method for steel sheets enabling high speed welding without the risk of generating welding defects and damage to the welding tool.

SUMMARY

We thus provide:

1. A friction stir welding method for steel sheets comprising:

inserting a rotating tool into an unwelded portion where two or more steel sheets are overlapped or butted together;

moving the rotating tool along portions to be welded while rotating the tool, so that a softened portion is formed in the steel sheets by friction heat generated between the rotating tool and the steel sheets, and the steel sheets are welded together by utilizing a plastic flow generated by the softened portion being stirred; and preheating the unwelded portion before welding by the rotating tool, wherein the preheating of the unwelded portion is performed by a pair of heating devices disposed over and under the unwelded portion and ahead of the rotating tool in the advancing direction.

2. The friction stir welding method for steel sheets according to aspect 1, wherein when the difference between a maximum temperature $T_t$ of a steel sheet surface on the side of the rotating tool at a position where welding is performed by the rotating tool and a maximum temperature $T_m$ of a steel sheet back surface at the same position is defined as $\Delta T$, the $\Delta T$ satisfies $0°\ C. \leq |\Delta T| \leq 200°\ C$.

3. The friction stir welding method for steel sheets according to aspect 1 or 2, wherein when the higher temperature of the $T_t$ and the $T_m$ is defined as T, T satisfies $0.6 \times T_{Ac1} < T < 0.8 \times T_{Melt}$, where $T_{Melt}$ is a melting point of the steel sheets, and $T_{Ac1}$ is a temperature defined by formula (1) using amounts of added elements of the steel sheets:

$$T_{Ac1}=723-10.7\ [\%\ Mn]-16.9\ [\%\ Ni]+29.1\ [\%\ Si]+16.9\ [\%\ Cr]+290\ [\%\ As]+6.38\ [\%\ W] \quad (1)$$

where [% M] represents the content of M element (mass %) in the steel sheets.

4. The friction stir welding method for steel sheets according to any one of aspects 1 to 3, wherein the heating devices are high-frequency induction heating devices, and the frequency to be used of the heating devices is 20 kHz or more and 360 kHz or less.

5. The friction stir welding method for steel sheets according to any one of aspects 1 to 4, wherein the C content of the steel sheet containing most C among the two or more steel sheets is 0.1 mass % or more and 0.6 mass % or less.

6. The friction stir welding method according to aspect 1, wherein a rear heating device for re-heating the welded portion is disposed behind the rotating tool in the advancing direction, and a maximum temperature $T_p$ of a region after re-heating of the region by the rear heating device satisfies $0.6 \times T_{Ac1} \leq T_p \leq 1.2 \times T_{Ac1}$, where $T_{Ac1}$ is a temperature defined by formula (1) using amounts of added elements of the steel sheets:

$$T_{Ac1}=723-10.7\ [\%\ Mn]-16.9\ [\%\ Ni]+29.1\ [\%\ Si]+16.9\ [\%\ Cr]+290\ [\%\ As]+6.38\ [\%\ W] \quad (1)$$

where [% M] represents the content of M element (mass %) in the steel sheets.

7. The friction stir welding method for steel sheets according to aspect 6, wherein a cooling device is disposed between the rotating tool and the rear heating device to cool the welded portion.

8. A method of manufacturing a joint of the steel sheets using the friction stir welding method according to any one of aspects 1 to 7.

By appropriately controlling the temperature distribution of the unwelded portion using a pair of heating devices disposed on the front and back surface sides of the steel sheets before performing friction stir welding, it is possible to perform high speed welding of steel sheets without the risk of generation of welding defects, damages to the welding tool, and the like.

REFERENCE SIGNS LIST 1, 2 Welding member
3 Welding device
4-1 Induction heating device (upper surface side)
4-2 Induction heating device (lower surface side)
8 Rear heating device
9 Cooling device
10 Rotating tool
11 Upper part of the rotating body
12 Probe
13 Unwelded portion
14 Welded portion
20 Unwelded portion
21, 22 Steel sheets
25 Welded portion
30 Backing material
35 Power source
40 Heating temperature setting panel
60 Welding tool (rotor)
61 Shoulder
62 Probe
70 Gas flame
71 Gas nozzle part
72 Heating device

DETAILED DESCRIPTION

We investigated the relationship between the temperature distribution right before initiating welding using a rotating tool and the conditions of the joint, in friction stir welding of steel sheets.

As a result, we discovered that:

(1) When the heated region is broad, good welded portions are obtained due to the influence of softening. However, the range of the heat-affected zone is expanded because the amount of heat transmitted to the steel sheets themselves is small and the influence of the heat generated by the rotating tool is large.

(2) Conversely, when the heated region is too small, welding performed by the rotating tool becomes insufficient and defects occur more easily.

(3) Therefore, when performing friction stir welding of steel sheets, management of the temperature range right before the welding is particularly important.

Friction stir welding is a method of performing welding with a welding tool while applying pressure and, normally, a backing material is used at a position opposite to the welding tool across the steel sheets. Therefore, past studies have proposed heating from one side, whether performed by high-frequency induction heating or a heat source such as arcs and laser beams.

However, when performing heating from one side, it is not possible to avoid the occurrence of difference in heat distribution between front and back surfaces of the steel sheets, and it is thought that this becomes a cause of welding defects.

In view of the above, we created prototype devices capable of heating the steel sheets from the front and back surfaces thereof, and investigated the relationship between the temperature of the front and back surfaces of the steel sheets and the presence of welding defects when heating the steel sheets by moving the prototype heating devices in the advancing direction of the welding tool at the same speed as the welding tool.

As a result, we discovered that, by reducing the temperature difference between the front and back surfaces of the steel sheets, the difference of stirring behavior between the tip of the tool and the shoulder is reduced to enable uniform welding, and accordingly welding can be performed without causing defects.

Further, we discovered that by raising the temperature of the unwelded portion, high speed welding is made possible by the softening of the steel sheets, whereas if the temperature is excessively raised, the plastic flow which is the principle of friction stir welding is reduced, and defects are caused.

Further, with high-C steel, cracks may occur due to embrittlement caused by rapid cooling after welding or residual stress generated from restraining, because of the high quench hardenability of said steel. Therefore, the cooling rate may need to be decreased or the hardening and embrittlement caused by tempering may need to be suppressed.

Our methods and products will be described in detail below.

The disclosure relates to friction stir welding where steel sheets are welded together by inserting a rotating tool into an unwelded portion where two or more steel sheets are overlapped or butted together, moving the rotating tool while rotating the same along the portions to be welded, and utilizing the softening of the steel sheets caused by the friction heat generated between the rotating tool and the above steel sheets and the plastic flow created by stirring the softened portions. Any friction stir welding device that enables welding steel sheets by pressurizing and rotating the rotating tool may be used, and the controlling method thereof is not particularly limited such as whether the device is controlled by positioning or pressurization.

Further, a friction stir welding device that performs welding from both sides, for example, by using a tool passing through the steel sheets, referred to as a bobbin tool, is also contemplated. In addition, a device having tools on both sides and a device having a moveable backing tool on one side are also contemplated.

As the rotating tool, a tool having a flat part called a shoulder and a protrusion called a probe which is concentric with the shoulder, is normally used. The shape of the probe is not limited and treatment such as screw-like spiral shaping may be performed thereto. Further, although the material is not particularly limited either, ceramics or metal material having excellent high temperature strength is preferable.

Figure 3:
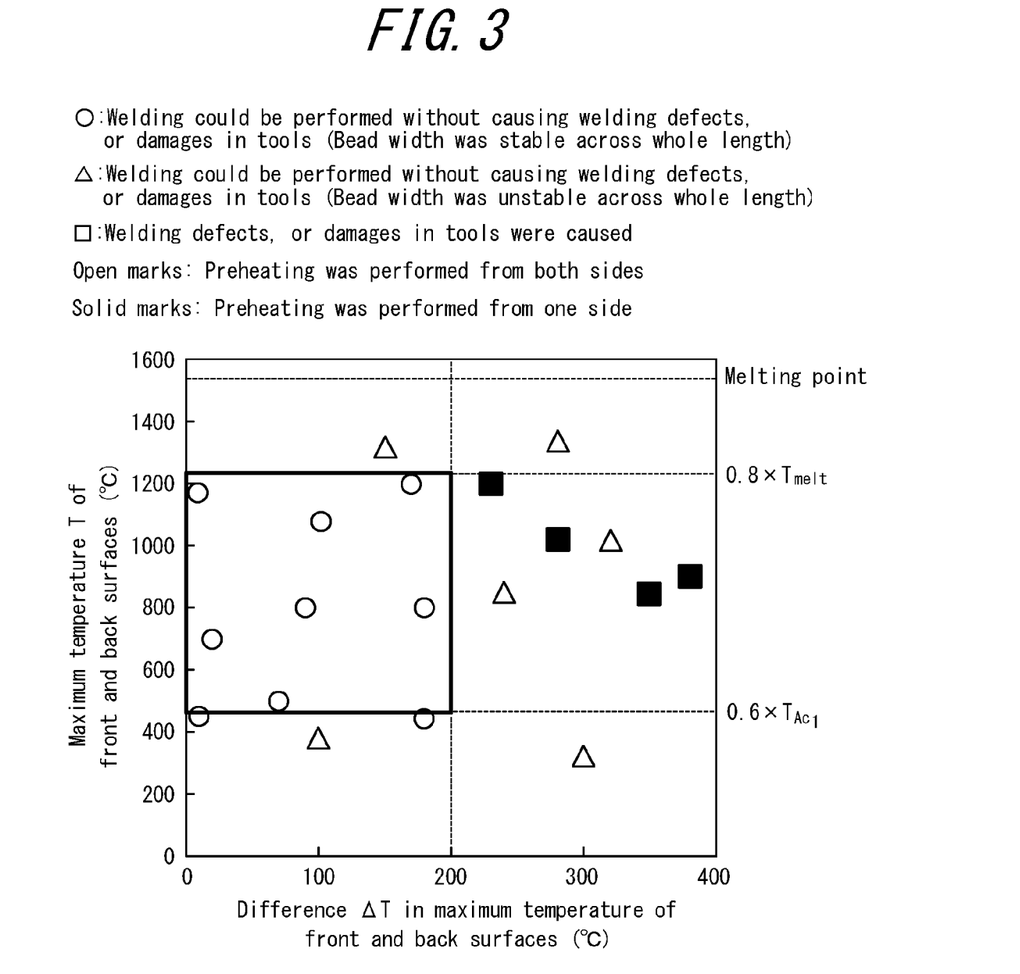
FIG. 3 shows the relationship between the temperature of the front and back surfaces of the steel sheets and the presence of welding defects or damages of tools, of when performing friction stir welding while heating the steel sheets by moving heating devices in the advancing direction of the welding tool at the same speed as the welding tool.

FIG. 3 shows the results of investigating the relationship between the temperature of front and back surfaces of the steel sheets and presence of welding defects or damages of tools, of when performing friction stir welding while heating the steel sheets by moving a pair of heating devices in the advancing direction of the welding tool at the same speed as the welding tool. The pair of heating devices are disposed over and under the steel sheets. The data was obtained by performing butt-welding or overlap welding at a welding speed of 1.5 m/min on steel sheets each having a sheet thickness of 3.0 mm to 5.0 mm, using a welding tool having a shoulder diameter d of 12 mm.

As shown in FIG. 3, even though welding failure and damage to tools are caused when pre-heating the steel sheets from one side, welding can be performed without welding failure if pre-heating is performed from both sides. Further, when the difference between a maximum temperature $T_t$ (° C.) of a steel sheet surface (steel sheet front surface) on the side of the rotating tool at a position where welding is performed by a rotating tool and a maximum temperature $T_m$ (° C.) of a steel sheet back surface at the same position is defined as $\Delta T$ (° C.), and the $\Delta T$ satisfies 0° C.$\leq |\Delta T| \leq$200° C., a joint is obtained without causing joint defects or damaging tools.

The reason a good joint is obtained by controlling $|\Delta T|$ to 0° C. to 200° C. is because, when the temperature difference between the front and back surfaces of the steel sheets is reduced, the difference of stirring behavior between the tool tip and the shoulder is reduced to enable uniform welding, and as a result, welding can be performed without causing defects.

It is possible to control the temperature to the above temperature range by performing heating on only one side. However, if heating is performed on only one side, the steel sheets are excessively heated compared to when heating the steel sheets from both sides and, therefore, there is a risk of thermal strain which may cause welding defects.

Regarding the steel sheet temperature, when the higher temperature of the maximum temperature $T_t$ of the steel sheet front surface and the maximum temperature $T_m$ of the steel sheet back surface is defined as T (° C.), and T satisfies $0.6 \times T_{Ac1} < T < 0.8 \times T_{Melt}$, a good joint with stable bead width is obtained and, regarding bead width, the minimum bead width and the maximum bead width were measured, and when the difference thereof is 20% or less than the minimum bead width, it was determined as being stable, where $T_{Melt}$ is a melting point of the steel sheets, and $T_{Ac1}$ is a temperature defined by formula (1) using amounts of added elements of the steel sheets and corresponds to the $Ac_1$ point of steel:

$$T_{Ac1}=723-10.7\ [\%\ Mn]-16.9\ [\%\ Ni]+29.1\ [\%\ Si]+ 16.9\ [\%\ Cr]+290\ [\%\ As]+6.38\ [\%\ W] \tag{1}$$

where [% M] represents the content of M element (mass %).

By raising T to a temperature over $0.6 \times T_{Ac1}$, it is possible to perform high speed welding due to the softening of the steel sheets. However, if the temperature T is raised to $0.8 \times T_{Melt}$ or higher, the plastic flow which is the principle of friction stir welding is reduced and, therefore, welding defects are caused.

A good joint with stable bead width is obtained without causing welding defects and damages to tools by satisfying the range of $|\Delta T|$ and the above range of T at the same time.

Next, the heating means will be explained.

The heating means/heater is not limited to a particular type and any means capable of heating up to a predetermined temperature may be used. However, heating means using high-frequency induction heating or a laser beam are advantageously applied.

Particularly, when using a high-frequency induction heating device, the frequency is preferably 20 kHz or more and 360 kHz or less in view of heating efficiency and heating range. It is possible to control the temperature to the above temperature range by using a device of such frequency.

For the positional relationship between the welding tool and the heating device as well as the heating range, the temperature before performing welding is important and, as long as the heating device is disposed ahead of the welding tool in the advancing direction, the distance from the welding tool to the heating device and the heating range of the heating device are not particularly limited. However, considering heating efficiency and the influence on the steel sheets, the heating device is preferably disposed ahead of the tool by a distance of 1 mm to 100 mm, and the heating range thereof is preferably from 0.1 cm² to 100 cm².

The heating device may move separately from or in conjunction with the movement of the tool. For example, in a device where the tool is movable, the heating device may be attached to the device such that it can move at the same speed as the device or alternatively in a device with a joint fixed to a movable stage, the heating device may be disposed on the stage. The heating device may be an induction heating device or a laser.

As mentioned above, the positional relationship between the welded portion and the heating device is not particularly limited as long as the heating device is disposed ahead of the tool in the advancing direction. However, when comparing the side where the advancing direction and the rotating direction of the tool are the same (advancing side i.e. left side in FIG. 1) and the side where the advancing direction and the rotating direction are opposite to each other (retreating side i.e. right side in FIG. 1), it is known that the resistance is higher and defects occur more easily in the advancing side, in friction stir welding. Therefore, by moving the heating range to the advancing side, weldability is stabilized even when performing high speed welding. When shifting the heating range to the advancing side, it is desirable that, the position in the heating range which reaches the maximum temperature is slightly shifted from the center line of the welded portion and is within the width of the welded portion.

Although the steel sheet as the subject of the disclosure is not particularly limited, the friction stir welding method described herein is particularly effective for steel sheets containing, as an additive element, 0.1 mass % to 0.6 mass % of carbon.

This is because, by applying the disclosure, such steel sheet can be welded at a particularly high speed compared to the conventional welding speed.

As previously mentioned, with high carbon steel contemplated herein, cracks may be generated after welding by the influence of hardening and embrittlement caused by rapid cooling and residual stress. Regarding this point, we enable suppression of generation of cracks by re-heating the welded portion after welding. However, excessive re-heating may become the cause of hardening and embrittlement in a wider range. If re-heating is performed, it is necessary for the maximum temperature $T_p$ of a region reached after the re-heating of the region by the heating device to be controlled to $0.6 \times T_{Ac1} \leq T_p \leq 1.2 \times T_{Ac1}$ to suppress such hardening and the like.

For the positional relationship between the welding tool and the rear heating device as well as the re-heating range of when performing the above re-heating, the re-heating is important and, as long as the re-heating device is disposed behind the welding tool in the advancing direction, the distance from the welding tool to the re-heating device and the heating range of the re-heating device are not particularly limited. However, considering the influence on efficiency and the steel sheets, the re-heating device is preferably disposed behind the tool by a distance of 1 mm to 200 mm, and the heating range thereof is preferably from 0.1 cm² to 100 cm².

Further, the re-heating device can move separately from or in conjunction with the movement of the tool. For example, in a device where the tool is movable, the heating device may be attached to the device such that it can move at the same speed as the device, or alternatively in a device with a joint fixed to a movable stage, the heating device may be disposed on the stage. The heating device may be an induction heating device or a laser.

When performing the above re-heating, it is advantageous to provide a cooling device between the welding tool and the rear heating device to prevent cracks caused by tempering. As the cooling method, gas, mist, copper sheet contact and the like may be applied. Considering cooling efficiency and the influences of oxidization on the joint and rust formation, it is desirable for inert gas to be used.

Further, cooling is preferably performed at the cooling rate of around 50° C./s to 1000° C./s until reaching 200° C. or lower.

As mentioned above, our methods enable high speed welding.

Specifically, while the general welding speed in friction stir welding is around 0.05 m/min to 0.2 m/min, welding can be performed, by applying the disclosure, at a rate of 0.5 m/min or more even when welding high carbon steel which is known as being difficult to weld at a high speed.

Other welding conditions in the friction stir welding method described herein are as follows.

Tool rotational speed: 100 rpm to 1500 rpm

To generate friction heat generated between the rotating tool and the welded portion of the workpiece and generate a plastic flow by stirring the welded portion softened by the heat with the tool, the tool rotational speed must be appropriately controlled. If the tool rotational speed is less than 100 rpm, an unwelded portion may be formed in the welded portion due to the lack of heat generation and plastic flow, or the rotating tool may be damaged due to the excessive load placed thereon. On the other hand, if the tool rotational speed exceeds 1500 rpm, sufficient thickness may not be obtained in the welded portion because heat generation and plastic flow becomes excessive and softened metal chips off from the welded portion as burrs, or the rotating tool may be excessively heated and damaged. Therefore, the tool rotational speed is preferably 100 rpm to 1500 rpm.

Tool rotational torque: 50 N·m to 1000 N·m

To generate friction heat generated between the rotating tool and the welded portion of the workpiece and generate a plastic flow by stirring the welded portion softened by the heat with the tool, the tool rotational torque must be set within an appropriate range. If the tool rotational torque is less than 50 N·m, an unwelded portion may be formed in the welded portion due to the lack of heat generation and plastic flow, or the rotating tool may be damaged due to the excessive load placed thereon. On the other hand, if the tool rotational torque exceeds 1000 N·m, sufficient thickness may not be obtained in the welded portion because heat generation and plastic flow becomes excessive and softened metal chips off from the welded portion as burrs, or the rotating tool may be excessively heated and damaged. Therefore, the tool rotational torque is preferably 50 N·m to 1000 N·m.

EXAMPLES

Example 1

Figure 4:
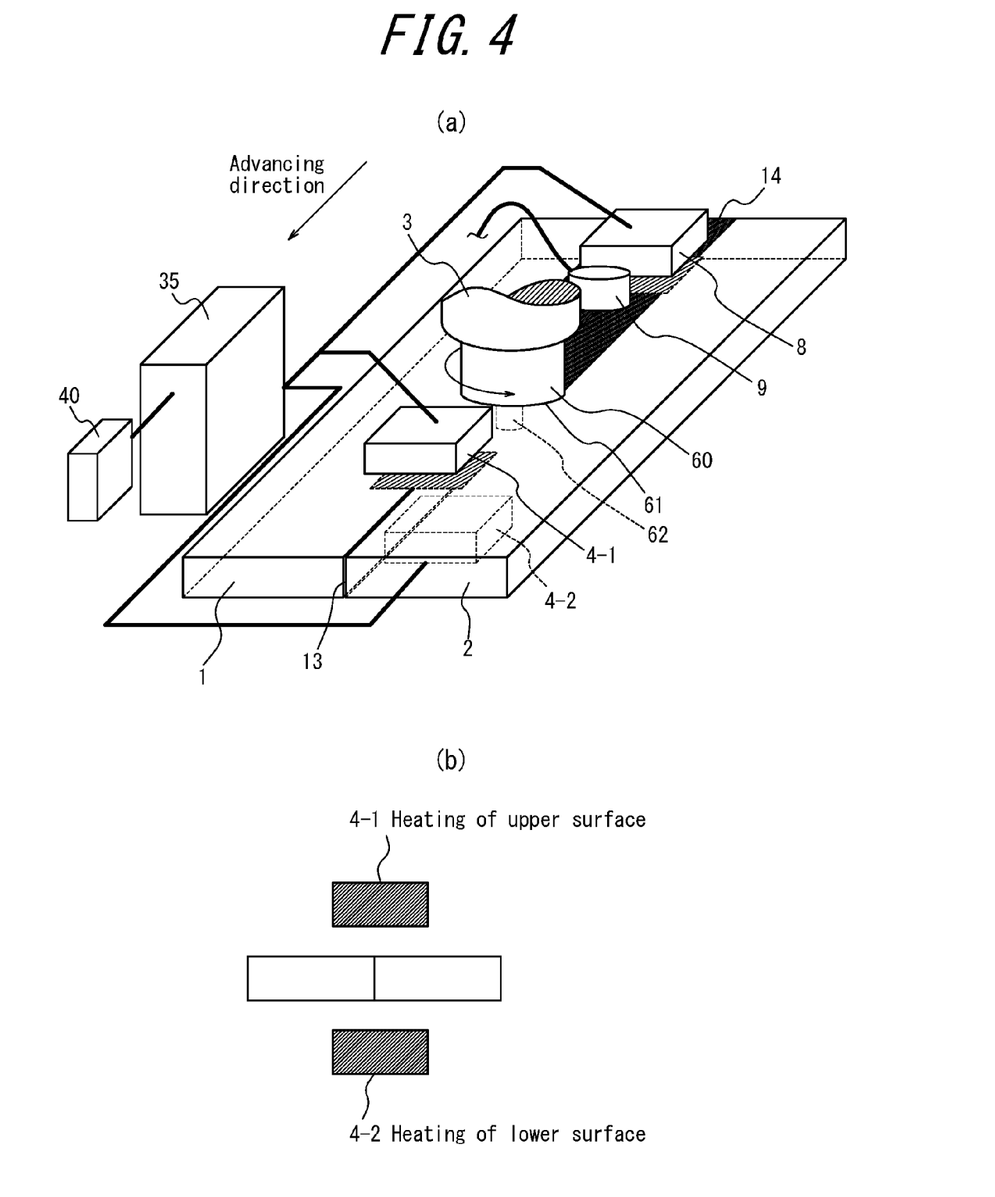
FIG. 4 shows a friction stir welding device used for carrying out the disclosed methods.

FIG. 4 shows a friction stir welding device. This device comprises an induction heating device 4-1 disposed on the same side as the tool with respect to the steel sheets, and another induction heating device 4-2 disposed on the opposite side, both devices disposed ahead of a welding tool 60 in the advancing direction, and heating is performed using this pair of induction heating devices. The tool 60 is shaped such that it has a tungsten carbide-based protruded probe 62 and a flat shoulder 61. Further, to suppress oxidization of the welded portion, welding was performed while spraying argon gas from the front of the tool 60 in the advancing direction.

Regarding the reference symbols in the drawings, reference numeral 8 indicates a rear heating device, reference numeral 9 indicates a cooling device, reference numeral 35 indicates a power source, and reference numeral 40 indicates a heating temperature setting panel.

Using the friction stir welding device shown in FIG. 4, friction stir welding was performed on steel sheets having a sheet thickness of 1.2 mm and containing C in various ratios under the conditions shown in Table 1. The joints were butted together using a non-angled or so-called I-type groove. Further, the frequency to heat steel sheets using the induction heating device was 30 kHz to 300 kHz.

The results of investigating the possibility of welding when performing the above friction stir welding is also shown in Table 1.

Regarding the possibility of welding, "B" and "A" indicate that welding could be performed, "A" indicates that welding could be performed without damaging the tool, no visible failure was observed across the whole length of the welded portion, and the bead width was stable, "B" indicates that welding could be performed without damaging the tool, and no visible failure was observed in the welded portion, and "C" indicates that the tool was damaged or a visible failure was observed somewhere across the whole length of the welded portion. As used herein, "failure" refers to a condition where irregularities of half or more of the sheet thickness or through holes are formed due to insufficient stirring or excessive stirring or a condition where a crack is formed in the welded portion. As for stability of bead width, when the difference between the maximum width and minimum width of the bead is 20% or less of the minimum width, bead width was evaluated as being stable.

TABLE 1

| No. | Welding Speed (m/min) | C Content in Steel Sheets (mass %) | $Ac_1$ Temperature $T_{Ac1}$ (°C.) | Melting Point $T_{melt}$ (°C.) | Heating on Front Surface | Heating on Back Surface | ΔT (°C.) | Maximum Temperature T of Front and Back Surfaces (°C.) | Welding Possibility | Remarks |
|---|---|---|---|---|---|---|---|---|---|---|
| 1 | 0.5 | 0.1 | 720 | 1550 | Performed | Performed | 180 | 1200 | A | Example |
| 2 | 0.5 | 0.1 | 720 | 1550 | Performed | Performed | 150 | 500 | A | Example |
| 3 | 0.5 | 0.1 | 720 | 1550 | Performed | Performed | 15 | 1150 | A | Example |
| 4 | 0.5 | 0.1 | 720 | 1550 | Performed | Performed | 13 | 480 | A | Example |
| 5 | 0.5 | 0.1 | 720 | 1550 | Performed | Performed | 100 | 800 | A | Example |
| 6 | 0.5 | 0.1 | 720 | 1550 | Performed | Performed | 180 | 1300 | B | Example |
| 7 | 0.5 | 0.1 | 720 | 1550 | Performed | Performed | 30 | 380 | B | Example |
| 8 | 0.5 | 0.1 | 720 | 1550 | Performed | Not Performed | 228 | 980 | C | Comparative Example |
| 9 | 0.5 | 0.1 | 720 | 1550 | Performed | Not Performed | 188 | 1024 | C | Comparative Example |
| 10 | 0.5 | 0.1 | 720 | 1550 | Performed | Not Performed | 160 | 380 | C | Comparative Example |
| 11 | 1 | 0.1 | 720 | 1550 | Performed | Performed | 175 | 1180 | A | Example |
| 12 | 1 | 0.1 | 720 | 1550 | Performed | Performed | 143 | 515 | A | Example |
| 13 | 1 | 0.1 | 720 | 1550 | Performed | Performed | 18 | 1120 | A | Example |
| 14 | 1 | 0.1 | 720 | 1550 | Performed | Performed | 13 | 480 | A | Example |
| 15 | 1 | 0.1 | 720 | 1550 | Performed | Performed | 109 | 810 | A | Example |
| 16 | 1 | 0.1 | 720 | 1550 | Performed | Performed | 172 | 1310 | B | Example |
| 17 | 1 | 0.1 | 720 | 1550 | Performed | Performed | 32 | 390 | B | Example |
| 18 | 1 | 0.1 | 720 | 1550 | Performed | Not Performed | 232 | 1020 | C | Comparative Example |
| 19 | 1 | 0.1 | 720 | 1550 | Performed | Not Performed | 172 | 988 | C | Comparative Example |
| 20 | 1 | 0.1 | 720 | 1550 | Performed | Not Performed | 155 | 363 | C | Comparative Example |
| 21 | 1 | 0.3 | 713 | 1530 | Performed | Performed | 103 | 702 | A | Example |
| 22 | 1 | 0.3 | 713 | 1530 | Performed | Performed | 88 | 810 | A | Example |
| 23 | 1 | 0.3 | 713 | 1530 | Performed | Performed | 144 | 1280 | B | Example |
| 24 | 1 | 0.3 | 713 | 1530 | Performed | Performed | 44 | 320 | B | Example |
| 25 | 1 | 0.3 | 713 | 1530 | Performed | Not Performed | 250 | 880 | C | Comparative Example |
| 26 | 1 | 0.3 | 713 | 1530 | Performed | Not Performed | 169 | 904 | C | Comparative Example |
| 27 | 1 | 0.3 | 713 | 1530 | Performed | Not Performed | 180 | 380 | C | Comparative Example |
| 28 | 1 | 0.5 | 711 | 1528 | Performed | Performed | 99 | 710 | A | Example |
| 29 | 1 | 0.5 | 711 | 1528 | Performed | Performed | 112 | 830 | A | Example |
| 30 | 1 | 0.5 | 711 | 1528 | Performed | Performed | 148 | 1256 | B | Example |
| 31 | 1 | 0.5 | 711 | 1528 | Performed | Performed | 32 | 330 | B | Example |
| 32 | 1 | 0.5 | 711 | 1528 | Performed | Not Performed | 240 | 912 | C | Comparative Example |
| 33 | 1 | 0.5 | 711 | 1528 | Performed | Not Performed | 187 | 972 | C | Comparative Example |
| 34 | 1 | 0.5 | 711 | 1528 | Performed | Not Performed | 163 | 360 | C | Comparative Example |
| 35 | 2 | 0.1 | 720 | 1550 | Performed | Performed | 172 | 1184 | A | Example |
| 36 | 2 | 0.1 | 720 | 1550 | Performed | Performed | 152 | 523 | A | Example |
| 37 | 2 | 0.1 | 720 | 1550 | Performed | Performed | 20 | 1180 | A | Example |
| 38 | 2 | 0.1 | 720 | 1550 | Performed | Performed | 23 | 502 | A | Example |
| 39 | 2 | 0.1 | 720 | 1550 | Performed | Performed | 103 | 830 | A | Example |
| 40 | 2 | 0.1 | 720 | 1550 | Performed | Performed | 180 | 1320 | B | Example |
| 41 | 2 | 0.1 | 720 | 1550 | Performed | Performed | 27 | 360 | B | Example |
| 42 | 2 | 0.1 | 720 | 1550 | Performed | Not Performed | 240 | 1010 | C | Comparative Example |
| 43 | 2 | 0.1 | 720 | 1550 | Performed | Not Performed | 165 | 954 | C | Comparative Example |
| 44 | 2 | 0.1 | 720 | 1550 | Performed | Not Performed | 143 | 344 | C | Comparative Example |

As shown in Table 1, a good joint was obtained without causing joint defects or damaging rotating tools even with a welding speed exceeding 0.5 m/min, when performing friction stir welding in accordance with our methods.

Example 2

Similarly to Example 1, friction stir welding was performed under the conditions shown in Table 2 using the friction stir welding device shown in FIG. 4. Although the welding conditions were substantially the same as Example 1, a cooling device 9 and a rear heating device 8 were used when performing welding in Example 2.

The results of investigating the joint efficiency when performing the above friction stir welding and the standard deviation of the joint efficiency of ten samples obtained under the same conditions are also shown in Table 2.

Regarding the possibility of welding, "B" and "A" indicate that welding could be performed, "A" indicates that welding could be performed without damaging the tool, no visible failure was observed across the whole length of the welded portion, and the bead width was stable, "B" indicates that welding could be performed without damaging the tool, and no visible failure was observed in the welded portion, and "C" indicates that the tool was damaged or a visible failure was observed somewhere across the whole length of the welded portion. Failure refers to when irregularities of half or more of the sheet thickness or through holes are formed due to insufficient stirring or excessive stirring or when a crack is formed in the welded portion.

Regarding the above standard deviation, the joint strength was divided by the base material strength to obtain a percentage value, and those with a value of more than 5% and 8% or less are indicated as "C", those with a value of more than 3% and 5% or less are indicated as "B", and those with a value of 3% or less are indicated as "A".

TABLE 2

| No. | Welding Speed (m/min) | C Content in Steel Sheets (mass %) | $Ac_1$ Temperature $T_{Ac1}$ (° C.) | Melting Point $T_{melt}$ (° C.) | Heating on Front Surface | Heating on Back Surface | ΔT (° C.) | Maximum Temperature T of Front and Back Surfaces (° C.) | Cooling |
|---|---|---|---|---|---|---|---|---|---|
| 1 | 0.5 | 0.1 | 720 | 1550 | Performed | Performed | 100 | 800 | Not Performed |
| 2 | 0.5 | 0.1 | 720 | 1550 | Performed | Performed | 100 | 800 | Not Performed |
| 3 | 0.5 | 0.1 | 720 | 1550 | Performed | Performed | 100 | 800 | Not Performed |
| 4 | 0.5 | 0.1 | 720 | 1550 | Performed | Performed | 100 | 800 | Performed |
| 5 | 0.5 | 0.1 | 720 | 1550 | Performed | Performed | 100 | 800 | Performed |
| 6 | 0.5 | 0.1 | 720 | 1550 | Performed | Performed | 100 | 800 | Performed |
| 7 | 0.5 | 0.1 | 720 | 1550 | Performed | Performed | 100 | 800 | Not Performed |
| 8 | 0.5 | 0.1 | 720 | 1550 | Performed | Performed | 100 | 800 | Not Performed |
| 9 | 0.5 | 0.1 | 720 | 1550 | Performed | Performed | 100 | 800 | Not Performed |
| 10 | 0.5 | 0.1 | 720 | 1550 | Performed | Performed | 100 | 800 | Performed |
| 11 | 0.5 | 0.1 | 720 | 1550 | Performed | Performed | 100 | 800 | Performed |
| 12 | 1 | 0.5 | 711 | 1528 | Performed | Performed | 112 | 830 | Not Performed |
| 13 | 1 | 0.5 | 711 | 1528 | Performed | Performed | 112 | 830 | Not Performed |
| 14 | 1 | 0.5 | 711 | 1528 | Performed | Performed | 112 | 830 | Not Performed |
| 15 | 1 | 0.5 | 711 | 1528 | Performed | Performed | 112 | 830 | Performed |
| 16 | 1 | 0.5 | 711 | 1528 | Performed | Performed | 112 | 830 | Performed |
| 17 | 1 | 0.5 | 711 | 1528 | Performed | Performed | 112 | 830 | Performed |
| 18 | 1 | 0.5 | 711 | 1528 | Performed | Performed | 112 | 830 | Not Performed |
| 19 | 1 | 0.5 | 711 | 1528 | Performed | Performed | 112 | 830 | Not Performed |
| 20 | 1 | 0.5 | 711 | 1528 | Performed | Performed | 112 | 830 | Not Performed |
| 21 | 1 | 0.5 | 711 | 1528 | Performed | Performed | 112 | 830 | Performed |
| 22 | 1 | 0.5 | 711 | 1528 | Performed | Performed | 112 | 830 | Performed |

| No. | Maximum Temperature before Re-heating (° C.) | Re-heating | Maximum Temperature after Re-heating (° C.) | Welding Possibility | Joint Efficiency ≥80% | Standard Deviation of Joint Efficiency (%, N = 10) | Remarks |
|---|---|---|---|---|---|---|---|
| 1 | 610 | Performed | 705 | A | Achieved | A | Example |
| 2 | 475 | Performed | 495 | A | Achieved | A | Example |
| 3 | 780 | Performed | 595 | A | Achieved | A | Example |
| 4 | 270 | Performed | 535 | A | Achieved | A | Example |
| 5 | 105 | Performed | 615 | A | Achieved | A | Example |
| 6 | 155 | Performed | 815 | A | Achieved | A | Example |
| 7 | — | Not Performed | — | A | Achieved | B | Example |
| 8 | 670 | Performed | 1255 | A | Achieved | B | Example |
| 9 | 700 | Performed | 935 | A | Achieved | B | Example |
| 10 | 170 | Performed | 1195 | A | Achieved | B | Example |
| 11 | 135 | Performed | 305 | A | Achieved | B | Example |
| 12 | 610 | Performed | 725 | A | Achieved | A | Example |
| 13 | 455 | Performed | 510 | A | Achieved | A | Example |
| 14 | 800 | Performed | 590 | A | Achieved | A | Example |
| 15 | 255 | Performed | 540 | A | Achieved | A | Example |
| 16 | 115 | Performed | 620 | A | Achieved | A | Example |
| 17 | 160 | Performed | 830 | A | Achieved | A | Example |
| 18 | — | Not Performed | — | A | Achieved | B | Example |
| 19 | 620 | Performed | 1220 | A | Achieved | B | Example |
| 20 | 720 | Performed | 920 | A | Achieved | B | Example |

TABLE 2-continued

| | | | | | | | | |
|---|---|---|---|---|---|---|---|---|
| 21 | 170 | Performed | 1195 | A | Achieved | B | Example |
| 22 | 125 | Performed | 285 | A | Achieved | B | Example |

As shown in Table 2, a joint with no welding defects was obtained with high joint efficiency even with a welding speed exceeding 0.5 m/min, when performing friction stir welding in accordance with our methods. In particular, when performing appropriate re-heating treatment or cooling and re-heating treatment after friction stir welding, an even more stable joint was obtained.

The invention claimed is:

1. A friction stir welding method for steel sheets comprising:
   inserting a rotating tool into an unwelded portion where two or more steel sheets are overlapped or butted together;
   moving the rotating tool along portions to be welded while rotating the tool so that a softened portion is formed in the steel sheets by friction heat generated between the rotating tool and the steel sheets, and the steel sheets are welded together by utilizing a plastic flow generated by the softened portion being stirred; and
   preheating the unwelded portion before welding by the rotating tool by a pair of heating devices disposed over and under the unwelded portion and ahead of the rotating tool in an advancing direction,
   wherein a rear heating device that re-heats the welded portion is disposed behind the rotating tool in an advancing direction, and a maximum temperature $T_p$ of a region after re-heating of the region by the rear heating device satisfies $0.6 \times T_{Ac1} \leq T_p \leq 1.2 \times T_{Ac1}$,
   where $T_{Ac1}$ is a temperature defined by formula (1) using amounts of added elements of the steel sheets:

$$T_{Ac1} = 723 - 10.7\,[\%\,Mn] - 16.9\,[\%\,Ni] + 29.1\,[\%\,Si] + 16.9\,[\%\,Cr] + 290\,[\%\,As] + 6.38\,[\%\,W] \quad (1)$$

where % Mn, % Ni, % Si, % Cr, % As, % W refer to an element content in mass % in the steel sheets, and
   wherein welding speed is 0.5 m/min or more and the rear heating device moves at the same speed as the rotating tool.

2. The friction stir welding method according to claim 1, wherein, when a difference between a maximum temperature $T_t$ of a steel sheet surface on a side of the rotating tool at a position where welding is performed by the rotating tool and a maximum temperature $T_m$ of a steel sheet back surface at the same position is defined as $\Delta T$, the $\Delta T$ satisfies $0°\text{C.} \leq |\Delta T| \leq 200°\text{C.}$ 3. The friction stir welding method according to claim 1, wherein, when the higher temperature of $T_t$ and $T_m$ is defined as T, the T satisfies $0.6 \times T_{Ac1} < T < 0.8 \times T_{Melt}$,
   where $T_{melt}$ is a melting point of the steel sheets.

4. The friction stir welding method according to claim 1, wherein the heating devices are high-frequency induction heating devices and the frequency for the heating devices is 20 kHz or more and 360 kHz or less.

5. The friction stir welding method according to claim 1, wherein the C content of the steel sheet containing most C among the two or more steel sheets is 0.1 mass % or more and 0.6 mass % or less.

6. The friction stir welding method according to claim 1, wherein a cooling device is disposed between the rotating tool and the rear heating device to cool the welded portion.

7. A method of manufacturing a joint of the steel sheets comprising joining the steel sheets with the friction stir welding method according to claim 1.

8. The friction stir welding method according to claim 2, wherein when the higher temperature of the $T_t$ and the $T_m$ is defined as T, the T satisfies $0.6 \times T_{Ac1} < T < 0.8 \times T_{Melt}$,
   where $T_{Melt}$ is a melting point of the steel sheets.

9. The friction stir welding method according to claim 2, wherein the heating devices are high-frequency induction heating devices and the frequency for the heating devices is 20 kHz or more and 360 kHz or less.

10. The friction stir welding method according to claim 3, wherein the heating devices are high-frequency induction heating devices and the frequency for the heating devices is 20 kHz or more and 360 kHz or less.

11. The friction stir welding method according to claim 8, wherein the heating devices are high-frequency induction heating devices and the frequency for the heating devices is 20 kHz or more and 360 kHz or less.

12. The friction stir welding method according to claim 2, wherein the C content of the steel sheet containing most C among the two or more steel sheets is 0.1 mass % or more and 0.6 mass % or less.

13. The friction stir welding method according to claim 3, wherein the C content of the steel sheet containing most C among the two or more steel sheets is 0.1 mass % or more and 0.6 mass % or less.

14. The friction stir welding method according to claim 4, wherein the C content of the steel sheet containing most C among the two or more steel sheets is 0.1 mass % or more and 0.6 mass % or less.

15. The friction stir welding method according to claim 8, wherein the C content of the steel sheet containing most C among the two or more steel sheets is 0.1 mass % or more and 0.6 mass % or less.

16. The friction stir welding method according to claim 9, wherein the C content of the steel sheet containing most C among the two or more steel sheets is 0.1 mass % or more and 0.6 mass % or less.

17. The friction stir welding method according to claim 10, wherein the C content of the steel sheet containing most C among the two or more steel sheets is 0.1 mass % or more and 0.6 mass % or less.

18. The friction stir welding method according to claim 11, wherein the C content of the steel sheet containing most C among the two or more steel sheets is 0.1 mass % or more and 0.6 mass % or less.

19. A method of manufacturing a joint of the steel sheets comprising joining the steel sheets with the friction stir welding method according to claim 2.

20. The friction stir welding method according to claim 1, wherein the welding speed is 1 m/min or more.

* * * * *